United States Patent
Chen et al.

(10) Patent No.: US 10,277,719 B2
(45) Date of Patent: Apr. 30, 2019

(54) RTU SERIAL COMMUNICATION MECHANISM

(71) Applicant: Honeywell International, Inc., Morristown, NJ (US)

(72) Inventors: Junyu Chen, Shanghai (CN); Haifeng Liang, Shanghai (CN); Enkui Lv, Shanghai (CN); Ke Zou, Shanghai (CN); Huagang Xu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 625 days.

(21) Appl. No.: 14/742,460

(22) Filed: Jun. 17, 2015

(65) Prior Publication Data
US 2016/0373562 A1 Dec. 22, 2016

(51) Int. Cl.
*H04L 29/06* (2006.01)
(52) U.S. Cl.
CPC .................................. *H04L 69/28* (2013.01)
(58) Field of Classification Search
CPC ....................................................... H04L 69/28
See application file for complete search history.

(56) References Cited

U.S. PATENT DOCUMENTS

| | | |
|---|---|---|
| 5,680,324 A | 10/1997 | Schweitzer, III et al. |
| 8,072,098 B2 | 12/2011 | Elias et al. |
| 8,392,626 B2 | 3/2013 | Wormmeester et al. |

(Continued)

FOREIGN PATENT DOCUMENTS

| | | |
|---|---|---|
| JP | 2013535730 A | 9/2013 |
| KR | 20100066815 A | 6/2010 |
| KR | 20120135142 A | 12/2012 |

OTHER PUBLICATIONS

The International Searching Authority, "Notification of Transmittal of the International Search Report and the Written Opinion of the International Searching Authority, or the Declaration," in connection with International Patent Application No. PCT/US2016/035777 dated Sep. 8, 2016, 16 pages, publisher International Application Division, Korean Intellectual Property Office, Daejeon, Republic of Korea.

(Continued)

*Primary Examiner* — Adnan Baig

(57) ABSTRACT

A method includes receiving inputs including a serial communication protocol specification and serial port settings associated with a serial communication channel. The method includes determining a transmission speed, a request size, and a response size of the serial communication channel based on the inputs. The method includes determining a timeout value corresponding to the serial communication channel based on the transmission speed, the request size, and the response size. The method includes automatically setting a timeout parameter for the serial communication using the determined timeout value. The timeout parameter defines a length of time between a start time of a transmission of a request through the serial communication channel and an end time of waiting to receive a response. The method includes in response to not receiving the response before the end time, determining that a first device is not connected to a second device through the serial communication channel.

18 Claims, 5 Drawing Sheets

(56) References Cited

U.S. PATENT DOCUMENTS

| | | |
|---|---|---|
| 8,656,065 B1 | 2/2014 | Gerhart et al. |
| 8,667,091 B2 | 3/2014 | Almadi et al. |
| 2003/0078006 A1 | 4/2003 | Mahany |
| 2005/0216107 A1 | 9/2005 | O'Donnell et al. |
| 2006/0023743 A1* | 2/2006 | Brown .................... H04L 69/16 370/466 |
| 2008/0235346 A1 | 9/2008 | Wei |
| 2008/0235420 A1* | 9/2008 | Wei ........................ H04L 43/10 710/110 |
| 2009/0287866 A1 | 11/2009 | Mejias |
| 2015/0084747 A1 | 3/2015 | McLaughlin et al. |
| 2015/0278144 A1 | 10/2015 | McLaughlin et al. |

OTHER PUBLICATIONS

International Search Report and Written Opinion dated Oct. 27, 2015 in connection with PCT/US2015/043607; 12 pages.

"25A Right Angle Signal/Power Combo"; SAMTEC Power Strip 25; 2008; 1 page.

"FCN-RTU Low Power Autonomous Controller Hardware"; STAR-DOM FCN-RTU; Yokogawa Electric Corporation; Dec. 2008; 13 pages.

"ControlWave Micro Process Automation Controller"; Instruction Manual; Emerson Process Management; Jun. 2013; 170 pages.

U.S. Patent Application "Remote Terminal Unit (RTU) Hardware Architecture" U.S. Appl. No. 14/459,557 filed Aug. 14, 2014; 36 pages.

* cited by examiner

RTU SERIAL COMMUNICATION MECHANISM

TECHNICAL FIELD

This disclosure is generally directed to industrial process control and automation systems. More specifically, this disclosure is directed to a remote terminal unit (RTU) serial communication mechanism and related method.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to a SCADA system. The SCADA system can execute control logic and alter the operations of actuators at the different sites via the RTUs. The RTUs themselves could also incorporate algorithms for data analytics.

The remote terminal unit (RTU) may include several serial communication connections to communicate with the SCADA system and one or more field devices. The rapid development of drilling for shale gas has caused oil and gas projects to require more input/output (I/O) ports. Generally, the RTU is deployed in the field; low bandwidth communication is a limitation of many oil and gas projects. When parameters are not configured properly, low baud rate communication may cause a serial communication timeout in many industry projects that are restricted by a low bandwidth channel. For example, a timeout parameter may be configured to be too short, and the RTU determines that an end time of the timeout wait period has occurred prior to receiving a response from a field device, which is an indicator that no connection is established between the RTU and the field device. Though the RTU can retry to connect by sending a subsequent request, the too short timeout wait period causes the same result, indicating that a connection cannot be established with the field device. Without a connection with the field device, such as a pressure sensor, the RTU cannot receive pressure sensor measurements from the field device in order to forward them to a user.

SUMMARY

This disclosure provides a remote terminal unit (RTU) serial communication mechanism and related method.

In a first example, a method includes receiving inputs including a serial communication protocol specification and serial port settings associated with a serial communication channel. The method also includes determining a transmission speed, a request size, and a response size of the serial communication channel based on the inputs. The method further includes determining a timeout value corresponding to the serial communication channel based on the transmission speed, the request size, and the response size. The method still further includes automatically setting a timeout parameter for the serial communication using the determined timeout value. The timeout parameter defines a length of time between a start time of a transmission of a request through the serial communication channel and an end time of waiting to receive a response. In addition, the method includes, in response to not receiving the response before the end time, determining that a first device is not connected to a second device through the serial communication channel.

In a second example, an apparatus includes processing circuitry configured to receive inputs including a serial communication protocol specification and serial port settings associated with a serial communication channel. The processing circuitry is configured to determine a transmission speed, a request size, and a response size of the serial communication channel based on the inputs. The processing circuitry is configured to determine a timeout value corresponding to the serial communication channel based on the transmission speed, the request size, and the response size. The processing circuitry is configured to automatically set a timeout parameter for the serial communication using the determined timeout value. The timeout parameter defines a length of time between a start time of a transmission of a request through the serial communication channel and an end time of waiting to receive a response. The processing circuitry is configured to, in response to not receiving the response before the end time, determine that the apparatus is not connected to a second device through the serial communication channel.

In a third example, a non-transitory computer readable medium embodying a computer program is provided. The computer program includes computer readable program code that, when executed by processing circuitry, causes the processing circuitry to receive inputs including a serial communication protocol specification and serial port settings associated with a serial communication channel. The computer readable program code also causes the processing circuitry to determine a transmission speed, a request size, and a response size of the serial communication channel based on the inputs. The computer readable program code further causes the processing circuitry to determine a timeout value corresponding to the serial communication channel based on the transmission speed, the request size, and the response size. The computer readable program code still further causes the processing circuitry to automatically set a timeout parameter for the serial communication using the determined timeout value. The timeout parameter defines a length of time between a start time of a transmission of a request through the serial communication channel and an end time of waiting to receive a response. In addition, the computer readable program code causes the processing circuitry to, in response to not receiving the response before the end time, determine that the apparatus is not connected to a second device through the serial communication channel.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
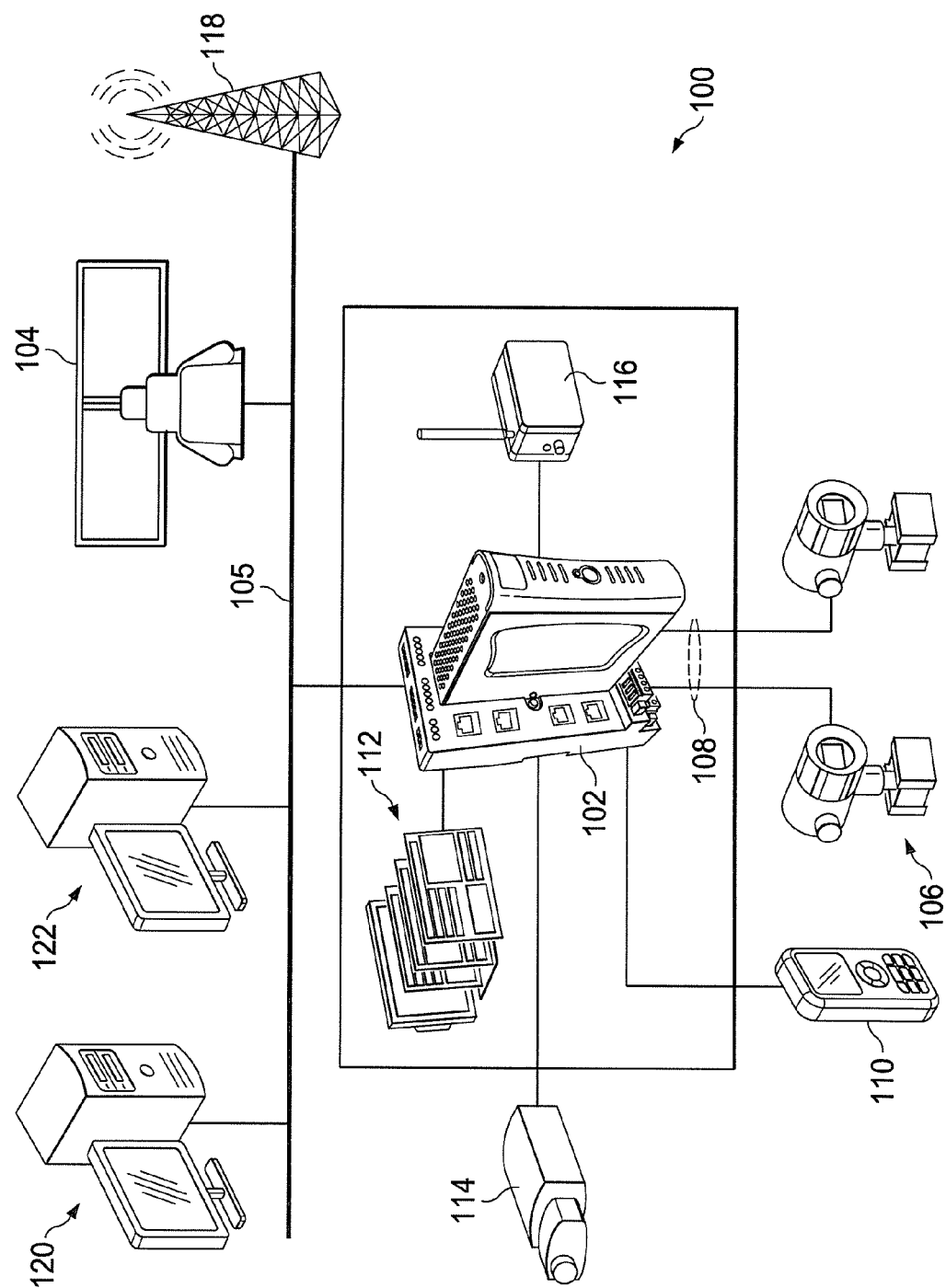
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

The RTU 102 incorporates one or more universal input/output (UIO) channels, where each I/O channel can be configured as an analog input (AI) (with or without digital communication), analog output (AO) (with or without digital communication), digital input (DI), digital output (DO), or pulse accumulator input (PI) type of channel. In this way, there is no need to use different I/O cards with different combinations of I/O channels in the RTU 102. Rather, each I/O channel can be configured as needed to be of the appropriate I/O type. Moreover, the RTU 102 can be expandable so that one or more I/O modules (each with one or more universal I/O channels) can be used with the RTU 102. Note, however, that it is also possible to use one or more reconfigurable I/O channels along with one or more fixed (non-reconfigurable) types of I/O channels in the RTU 102. For instance, the RTU 102 could include one or more fixed I/O channels, and the RTU 102 could be expanded to include one or more reconfigurable I/O channels.

As described more particularly below, the RTU 102 uses inputs received from the RTU builder 122 and automatically (i.e., without human intervention) sets communication parameters based on the inputs. More particularly, the RTU 102 calculates a timeout parameters value for each serial port connection with an external device and configures itself to apply the calculated timeout parameters values.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 with one or more universal I/O channels can be used. One or more RTUs could be used in any other suitable system.

FIGS. 2 through 6 illustrate details of an example RTU 102 according to this disclosure. For ease of explanation, the RTU 102 is described as being used in the system 100 of FIG. 1. However, the RTU 102 could be used in any other suitable system.

Figure 2:
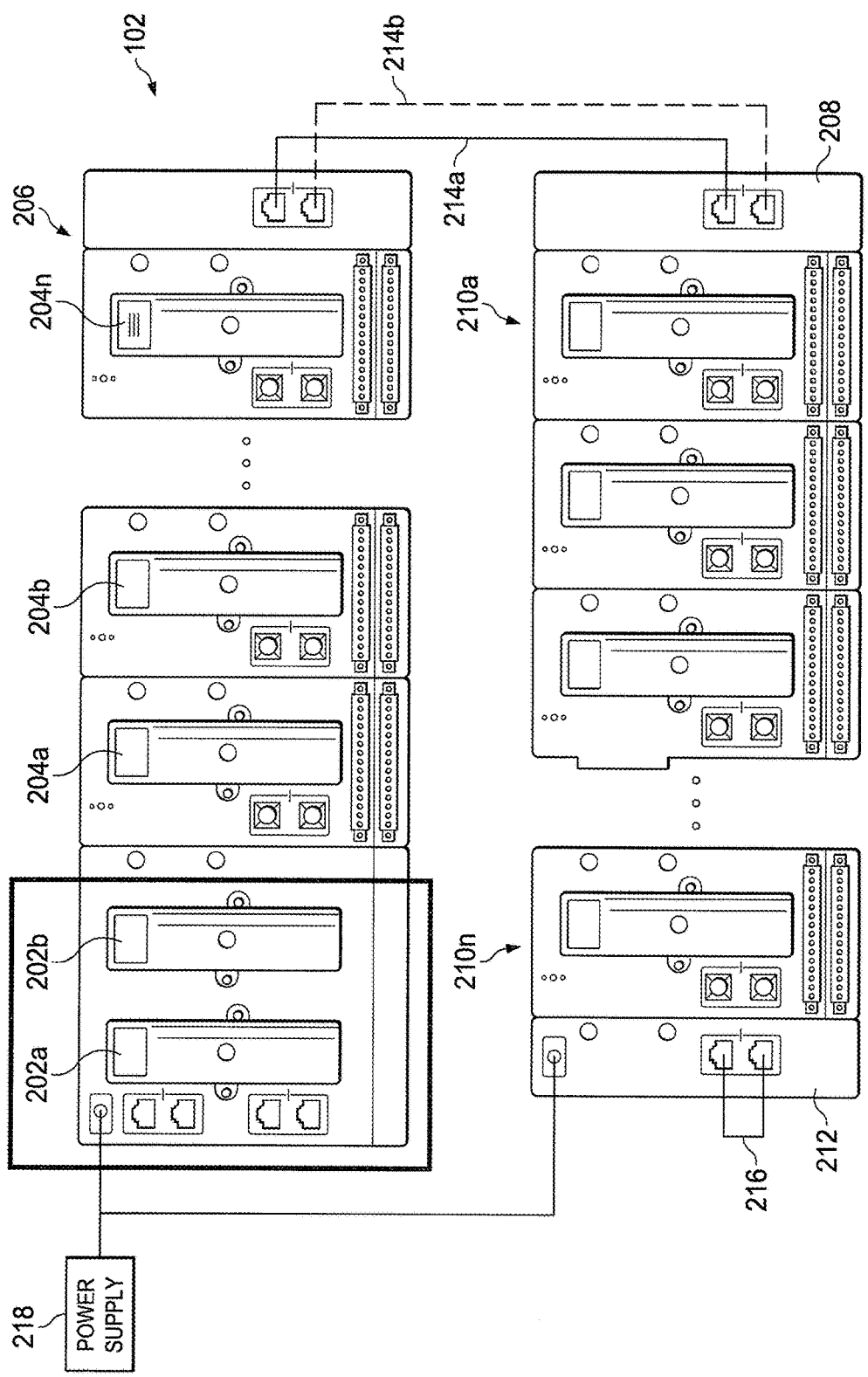
FIGS. 2 through 6 illustrate details of an example RTU according to this disclosure.

FIG. 2 illustrates an example of the RTU 102 with redundant controller modules 202a-202b, a first set of I/O modules 204a-204n, and an expansion board 206. Each controller module 202a-202b represents a module that executes control logic and other functions of the RTU 102. For example, each controller module 202a-202b could execute control logic that analyzes sensor data and generates control signals for actuators. Each controller module 202a-202b could also execute functions that control the overall operation of the RTU 102, such as functions supporting communications with external devices or systems. Each controller module 202a-202b includes any suitable structure for controlling one or more operations of an RTU. In some embodiments, each controller module 202a-202b includes at least one processing device that executes a LINUX or other operating system.

The I/O modules 204a-204n support communications between the controller modules 202a-202b and external devices or systems (such as the field devices 106) via I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as needed. The circuitry can be used to configure and reconfigure each I/O channel as desired. For instance, example types of reconfigurable I/O channels are shown in U.S. Pat. No. 8,072,098; U.S. Pat. No. 8,392,626; and U.S. Pat. No. 8,656,065 (all of which are hereby incorporated by reference in their entirety). Also, the use of reconfigurable I/O channels in an RTU is described in U.S. patent application Ser. No. 14/228,142 (which is hereby incorporated by reference in its entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller modules 202a-202b are implemented using separate circuit boards. Communications between the redundant controller modules 202a-202b could occur via various communication interfaces of the circuit boards. If the redundant controller modules 202a-202b are present in the RTU 102 (which need not always be the case), the RTU 102 can automatically manage which redundant controller module has control of each I/O module and provide seamless switchover upon a failure of a controller module.

Although FIG. 2 illustrates details of an example RTU 102, various changes may be made to FIG. 2. For example, the number(s) and type(s) of ports and interfaces shown in FIG. 2 are for illustration only. Also, the functional divisions of the RTU 102 shown in FIG. 2 are for illustration only. Various components in FIG. 2 could be omitted, combined, or further subdivided and additional components could be added according to particular needs.

Figure 3:
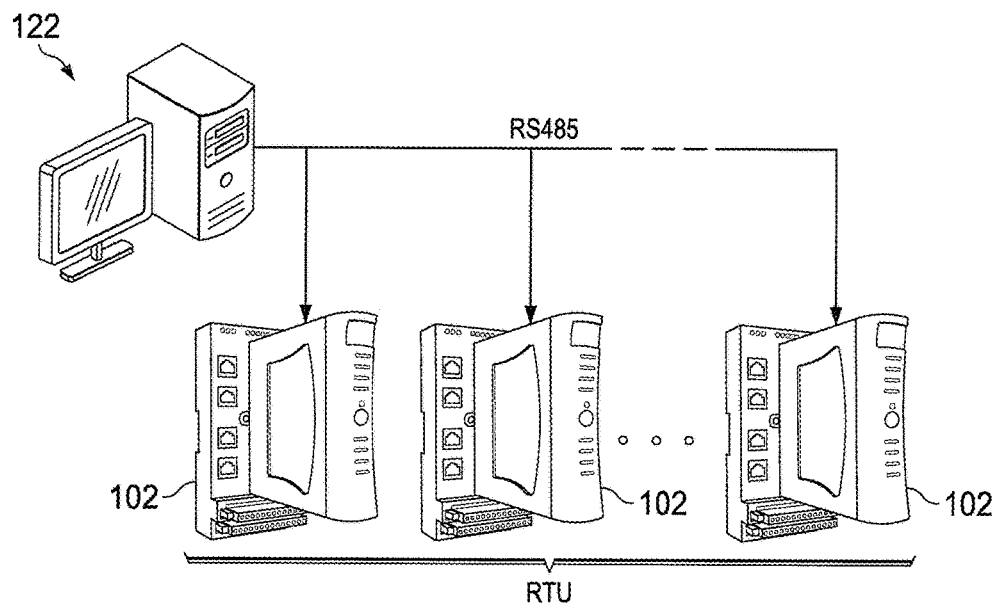
Figure 4:
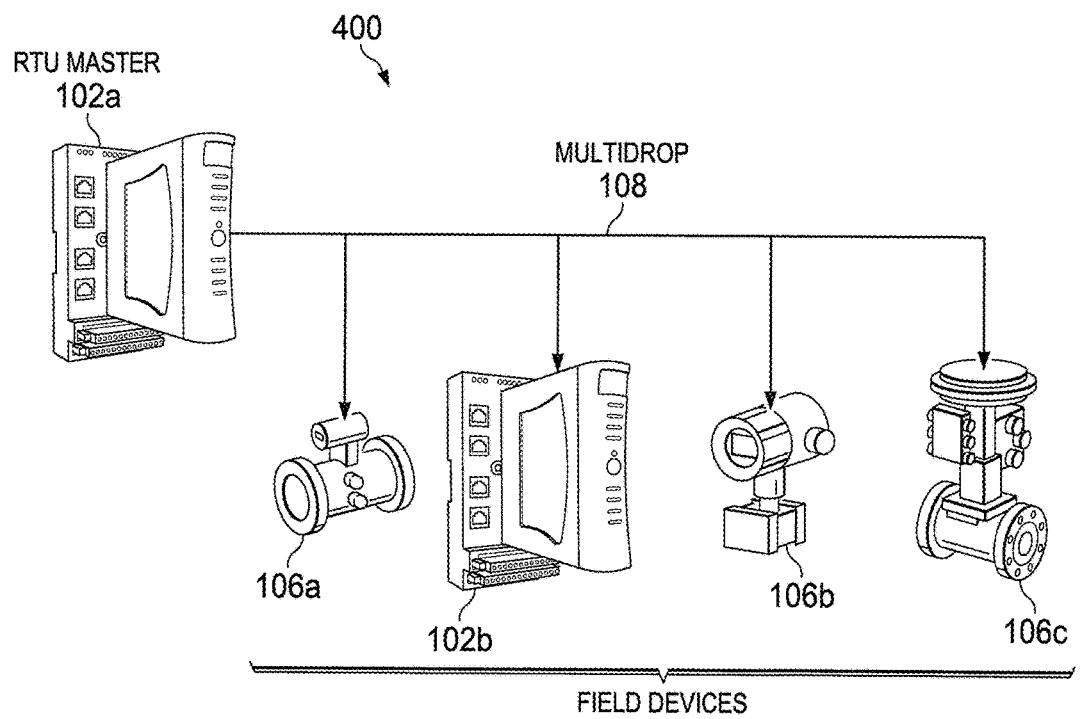

FIGS. 3 and 4 illustrate additional details regarding RTUs, such as the RTU 102. As noted above, an RTU can include several serial communication connections. Examples of serial communication connections for the RTU include RS232, RS485, and Ethernet to communicate with the SCADA system and many field devices. Engineers can choose serial communication rather than Ethernet to control the distribution of I/O ports for power savings; however, the serial communication typically provides a slower speed of data transmission. To prevent the RTU from perpetually waiting to receive a response from a field device, each RTU is configured to include a timeout parameter for each serial port communication. The timeout parameter is an amount of time that the RTU will wait to receive a response from a field device after transmitting a request to the field device. Generally, engineers determine a proper timeout interval for each field device connected to the RTU and enter the parameter of each connected field device, namely, the timeout interval, one by one.

Given that each RTU can connect to multiple field devices (for example, 32 field devices), engineers must configure dozens of serial communication function blocks per RTU. Further, given that the industrial control and automation system 100 includes thousands of RTUs, deploying these thousands of RTUs is a very complex and time consuming process executed by the engineers. In practice, some owners (e.g., RTU companies) of an industrial control and automation system 100 have considered it to be a waste of time for engineers to determine and enter these dozens of thousands of timeout intervals, and instead set an exaggerated (extralong) value for the default timeout parameters. However, a broken field device can cause a fault in a serial port multidrop scenario that blocks the whole logic program within the RTU. In cases where the RTU is deployed in the field, it is difficult to repair the RTU or the broken field device immediately. Consequently, a broken field device in a serial port multidrop scenario can prevent other field devices from communicating with the RTU until a field repair is complete.

Embodiments of this disclosure provide a RTU serial communication mechanism configured to perform a related method wherein the RTU parses the communication protocol and then calculate a timeout parameter value for each serial port connection based on serial port settings. According to this disclosure, a serial communication channel can be categorized into two cases according to different scenarios. In a first case, as shown in FIG. 3, a SCADA system can communicate with multiple RTUs at the same time; as such, each RTU can receive data from the SCADA system through the serial communication. In the second case, as shown in FIG. 4, the RTU is implemented as a controller that controls other field devices, and the RTU Serial RS485 port capacity is 32. As described below, these two cases are not mutually exclusive in that RTU 102 can implement functions applicable in both cases.

FIG. 3 illustrates a SCADA communication system 300 according to embodiments of this disclosure. The embodiment of the system 300 shown in FIG. 3 is for illustration only. Other embodiments could be used without departing from the scope of the present disclosure.

The SCADA communication system 300 includes a RTU builder 122, and multiple RTUs 102 communicably coupled to the RTU builder 122 through a multidrop serial communication channel (for example, a Recommended Standard 485 (RS485) serial communication channel). In other embodiments, the multidrop serial communication channel can be a RS232 serial communication channel or other type of serial communication channel. For example, the RTU builder 122 can be a R430-EPKS (Experion Process Knowledge System) NR SRV2-Modbus by HONEYWELL INTERNATIONAL INC. that is configured to communicate with the multiple RTUs 102a at the same time.

In the example shown, the RTU builder 122 includes a RS485 serial port configured to connect with and send signals to thirty-two (32) RTUs 102a, each RTU 102a connected through its own RS485 serial port. The RTU builder 122 transmits a request for information to the RTUs 102 at the same time, and afterwards, one or more of the RTUs 102 transmits a response back to the RTU builder 122.

The RTU builder 122 is configured to determine the communication protocol (e.g., RS485 protocol, RS232 protocol, ModBus protocol, or TMP3 protocol) that an RTU 102 uses to communicate with its corresponding field devices 106. That is, the RTU builder 122 requests information identifying the type of communication protocol that the RTU 102 uses to communicate with its corresponding field devices 106, and in response receives information identifying the type of communication protocol from the RTU 102. The RTU builder 122 stores communication protocol specifications in a memory and matches the information identifying the type of communication protocol to determine which communication protocol the RTU 102 uses. Once the communication protocol used by the RTU 102 has been determined, the RTU builder 122 transmits inputs (described more particularly below in FIG. 6) to the RTU 102, wherein the inputs include a request size, a response size, and a data stream size, all based on the protocol stack.

Also, the RTU builder 122 includes a user interface that enables a user to input parameters of serial port settings (described more particularly below in FIG. 6). The RTU builder 122 transmits the parameters of serial port settings to the RTU 102.

FIG. 4 illustrates a Serial Port Multidrop system 400 according to embodiments of this disclosure. The embodiment of the system 400 shown in FIG. 4 is for illustration only. Other embodiments could be used without departing from the scope of the present disclosure.

The Serial Port Multidrop system 400 includes multiple field devices 106a-106c, wired connections 108, and at least one RTU 102 that includes master/slave management devices. Example types of master/slave management devices are shown in U.S. patent application Ser. No. 14/670,328 (which is hereby incorporated by reference in its entirety). For ease of explanation, the RTU 102 is shown as a master RTU 102a and a slave RTU 102b to show that the RTU 102 is controlled by a redundant controller module currently having a master state. However, it is to be understood that the RTU 102a and RTU 102b together constitute the RTU 102.

The master RTU 102a determines (for example, calculates) a feasible timeout value for each of its field devices 106a, 106b, 106c, and 102b. For example, in order to determine a feasible timeout value for a first field device 106a, the master RTU 102a multiplies the baud rate of the wired connection 108 by a sum of (i) a request time, which is the amount of time for a request transmitted from the master RTU 102a to be received by the first field device 106a through the wired connection 108, and (ii) a response time, which is the amount of time for a response transmitted from the first field device 106a to be received by the master RTU 102a through the wired connection 108. The master RTU 102a determines the request time and the response time based on communication protocol specifications and based on parameters of serial port settings sent from the RTU builder 122. The master RTU 102a stores the feasible timeout value as the timeout parameter for the serial port connection with the first field device 106a. Once the master RTU 102a has determined the feasible timeout value, this determined value is applied as the timeout parameter instead of the default timeout parameter. The master RTU 102a is configured to determine and apply a feasible timeout value for its other field devices 106b, 106c and 102b in a similar manner.

As a technical advantage, the ability of the RTU 102 to calculate the feasible timeout value saves time because an engineer is no longer needed to perform this calculation nor enter a timeout parameter for each field device one by one. Also, the calculation by the RTU 102 increases the accuracy of the feasible timeout value compared to the accuracy of a human calculation. Further, the ability of the RTU 102 to calculate the feasible timeout value saves time because a new feasible timeout value can be applied to the timeout parameter of one or more field devices when a change to the serial protocol specification or serial port settings occurs. As another improvement, the RTU 102 reduces the effect that a fault communication node has on other nodes in a serial port multidrop scenario by preventing the other nodes from having to wait for the RTU 102 to receive a response from the fault communication node before allowing communications with the other nodes.

The wired connections 108 can be implemented as a multidrop bus of a serial communication channel, such as a RS485 connection. Though the RS485 protocol is configured for multidrop bus series communications, other communication protocols (e.g., RS232) can implement multidrop bus series communications if a modem is added at each field device in the system 400. That is, the wired connections 108 carry signals between the master RTU 102a and each of its field devices 106a-106c (including the slave RTU 102b). As a serial communication channel, the wired connections 108 allows the master RTU 102a to receive signals from one field device 106a-106c at a time. The wired connections 108 receives one bit at a time, whether transmitting a request or a response. The baud rate of the wired connections 108 defines the speed (e.g., bits per second; symbols per second) of transmissions from a field device 106a-106c to the master RTU 102a.

Figure 5:
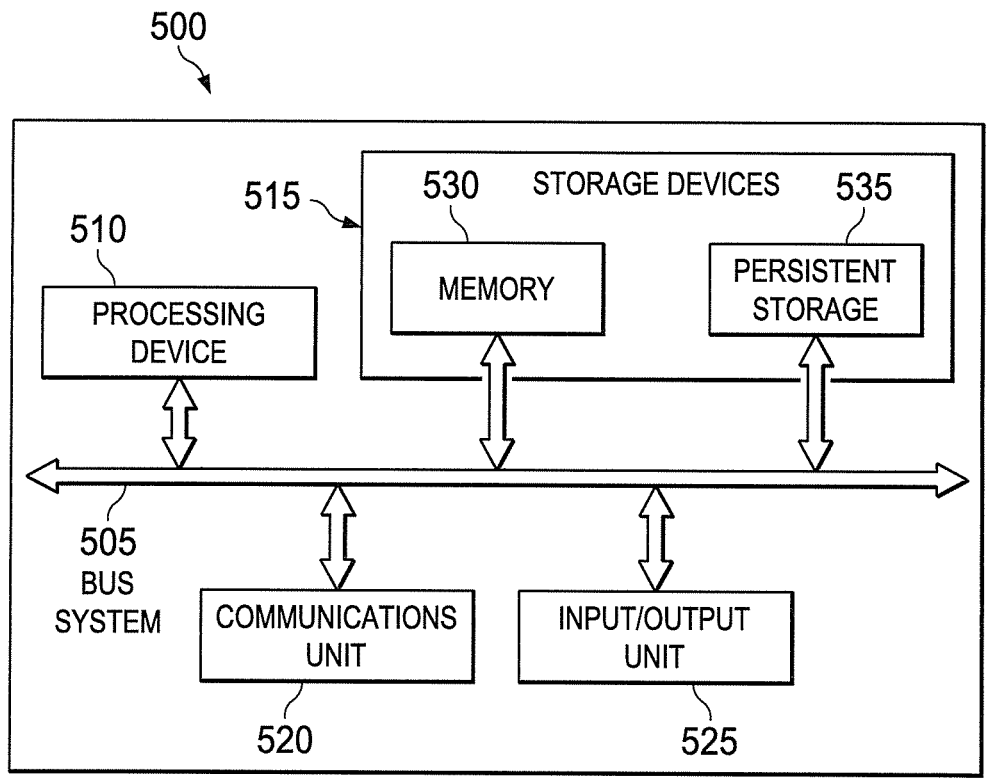

FIG. 5 illustrates an example device 500 supporting RTU serial communication mechanism according to embodiments of this disclosure. The device 500 could, for example, represent the RTU 102 or other computing device supporting RTU serial communication mechanism.

As shown in FIG. 5, the device 500 includes a bus system 505, which supports communication between at least one processing device 510, at least one storage device 515, at least one communications unit 520, and at least one input/output (I/O) unit 525.

The processing device 510 executes instructions that may be loaded into a memory 530. The processing device 510 may include any suitable number(s) and type(s) of processors or other devices in any suitable arrangement. Example types of processing devices 510 include microprocessors, microcontrollers, digital signal processors, field programmable gate arrays, application specific integrated circuits, and discreet circuitry.

The memory 530 and a persistent storage 535 are examples of storage devices 515, which represent any structure(s) capable of storing and facilitating retrieval of information (such as data, program code, and/or other suitable information on a temporary or permanent basis). The memory 530 may represent a random access memory or any other suitable volatile or non-volatile storage device(s). The persistent storage 535 may contain one or more components or devices supporting longer-term storage of data, such as a ready only memory, hard drive, Flash memory, or optical disc.

The communications unit 520 supports communications with other systems or devices. For example, the communications unit 520 could include a network interface card or a wireless transceiver facilitating communications over the network 105. The communications unit 520 may support communications through any suitable physical or wireless communication link(s).

The I/O unit 525 allows for input and output of data. For example, the I/O unit 525 may provide a connection for user input through a keyboard, mouse, keypad, touchscreen, or other suitable input device. The I/O unit 525 may also send output to a display, printer, or other suitable output device.

Although FIG. 5 illustrates one example of a device 500 supporting the RTU serial communication mechanism, various changes may be made to FIG. 5. For example, computing devices come in a wide variety of configurations. The device 500 shown in FIG. 5 is meant to illustrate one example type of computing device and does not limit this disclosure to a particular type of computing device.

Figure 6:
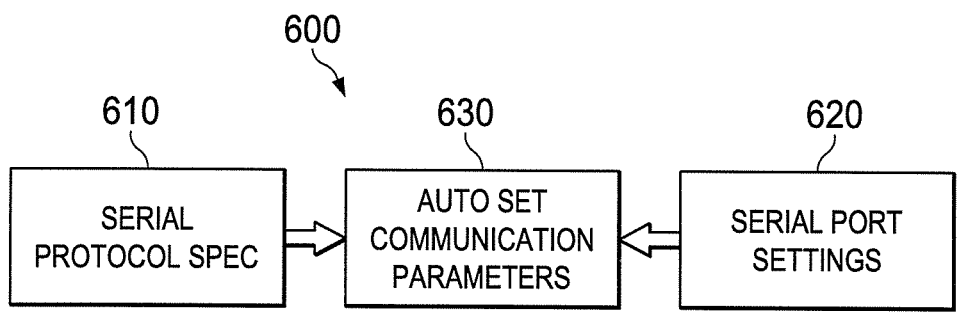

FIG. 6 illustrates a workflow 600 of the RTU serial communication mechanism according to embodiments of this disclosure. More particularly, the workflow 600 prepares the master RTU 102a for calculating a feasible timeout value for its field devices. The embodiment of the workflow 600 shown in FIG. 6 is for illustration only. Other embodiments could be used without departing from the scope of the present disclosure.

As described above, the RTU builder 122 determines the communication protocol (e.g., RS485 or RS232) that an RTU 102 uses to communicate with its corresponding field devices 106 and inputs corresponding communication protocol specifications 610 to the master RTU 102a. Each communication protocol specification 610 includes a request size, a response size, and a data stream size, each of which are a predetermined number of bits. More particularly, the RS485 communication protocol specifies a fixed number of bits to be included in a request. Another communication protocol may specify a different number of bits to be included in a request. The number of bits is directly correlated with the amount of time required to transmit the request, as a higher number of bits requires more time for transmission. Similarly, the communication protocol specifies a fixed number of bits to be included in a response and a data transmission, which affects the amount of time required for transmission.

Also as described above, the RTU builder 122 receives user input containing parameters of serial port settings 620 and inputs the settings to the master RTU 102a. The parameters of serial port settings 620 can include baud rates, stop bits, parity, data bits, and stop bits. In certain embodiments, the user inputs the parameters by making selections from a table or a drop-down menu; additionally, the user may manually type in values for the parameters. Table 1 below provides examples of various parameter values that the user can select. In certain embodiments, the RTU 102 is configured to a set of multiple communication protocols, but certain serial port settings 620 are incompatible with certain communication protocols; thus, the user selections of parameters of serial port settings 620 can limit the RTU 102 to a subset of compatible communication protocols.

TABLE 1

Examples of User Selectable Parameter Values for Serial Port Settings

| Baud Rate | Stop Bits | Parity | Data Bits |
| --- | --- | --- | --- |
| 300 | Bit 1 | Odd | Bit 7 |
| 600 | | | |
| 1200 | | | |
| 2400 | | | |
| 4800 | | | |
| 9600 | Bits 2 | Even | Bit 8 |
| 19200 | | | |
| 38400 | | | |
| 57600 | | | |
| 115200 | | | |

The master RTU 102a receives and automatically combines the communication protocol specifications 610 and the parameters of serial port settings 620 into a set of communication parameters 630. The master RTU 102a uses the set of communication parameters 630 to calculate a feasible timeout value for each of its field devices 106a, 106b, 106c, and 102b.

Figure 7:
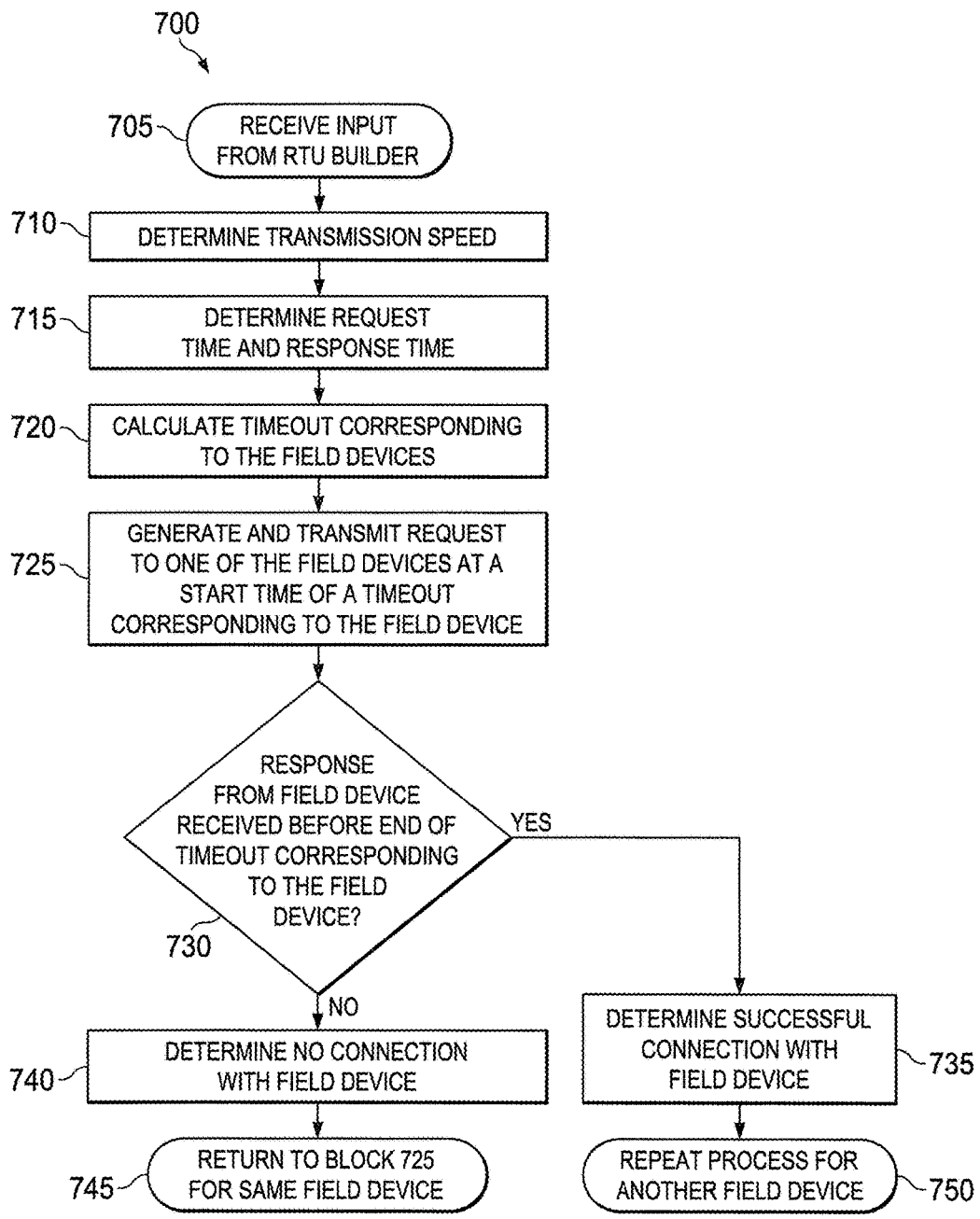
FIG. 7 illustrates an example process for configuring communication parameters for and operating a RTU serial communication mechanism according to embodiments of this disclosure.

FIG. 7 illustrates an example process 700 for configuring communication parameters (e.g., one or more timeout parameters) for and operating a RTU serial communication mechanism according to embodiments of this disclosure. The embodiment of the process 700 shown in FIG. 7 is for illustration only. Other embodiments could be used without departing from the scope of the present disclosure. This disclosure describes the process 700 as being performed by the RTU 102. Of course, the process 700 could be performed by, any other suitable device or system.

In block 705, the RTU 102 receives input from the RTU builder 122. The input includes the communication protocol specifications 610 and the parameters of serial port settings 620.

In block 710, the RTU 102 determines the transmission speed based on the serial port settings 620. For example, the serial port setting 620 can include a baud rate, which can be used as the transmission speed for a serial communication from the RTU 102.

In block 715, the RTU 102 determines the request time and response time corresponding to the communication protocol specifications 610. More particularly, the RTU 102 determines the request time by identifying the request size corresponding to the communication protocol specifications 610 and multiplying the request size by the transmission speed. The RTU 102 determines the response time in a similar manner.

In block 720, the RTU 102 determines a feasible timeout value for each of its field devices 106a-106c (including slave RTU 102b). For example, the RTU 102 calculates a feasible timeout value TO1 corresponding to the field device 106a, and calculates feasible timeout values TO2, TO3, and TO4 for the slave RTU 102b, the field device 102b, and the field device 102c, respectively. Different field devices can have different feasible timeout values; for example, TO1 can be a different length of time than TO2, TO3, or TO4.

In block 725, the RTU 102 generates and transmits a request to one of its field devices at a start time (t0) of the timeout corresponding to that field device. For example, the RTU 102 attempts to communicate with the field device 106b (e.g., a pressure sensor) by transmitting a request to the field device 106b at t0. The RTU 102 starts a clock at the start time t0 and counts up to the amount of time indicated by the timeout parameter, which is TO3 corresponding to the field device 106b. The request can instruct the field device 106b to provide data, such as pressure measurements.

In block 730, the RTU 102 determines whether a response from the field device has been received before an end of the timeout corresponding to the field device. The RTU 102 can make this determination prior to the end time t2 of the timeout. For example, the process 700 immediately proceeds to block 735 if the RTU 102 receives a response from the field device 106b at a first time t1 before the end time t2, which is (t0+TO3). However, if the RTU 102 waits the entire length of the timeout TO3 and does not receive a response from the field device 106b before the clock reaches the end time t2, then the process 700 proceeds to block 740.

In block 735, the RTU 102 determines that a successful connection has been established with the field device (e.g., the field device 106b). Then, the process 700 proceeds to block 750, wherein the RTU 102 attempts to communicate with another field device. For example, in block 750, the RTU 102 returns to block 725 and transmits a request to the field device 106a in an attempt to communicate with the field device 106a (e.g., a heater); however, this time, the RTU 102 applies the TO1 timeout value corresponding to the field device 106a to which the request was sent.

In block 740, the RTU 102 determines that no connection with the field device (e.g., the field device 106b) has been established. Then, the process 700 proceeds to block 745, wherein the RTU 102 retries to communicate with the same field device (e.g., the field device 106b). That is, in block 745, the RTU 102 returns to block 725 and transmits a request to the field device 106b. In certain embodiments, the RTU 102 will retry communication with the same field device for a threshold number of attempts, and then the RTU 102 will stop retrying and instead notify the user that all attempts to establish a serial communication channel with the same field device 106b have failed.

Although FIG. 7 illustrates one example of a process for configuring communication parameters for and operating a RTU serial communication mechanism, various changes may be made to FIG. 7. For example, while FIG. 7 illustrates a series of steps, various steps could overlap, occur in parallel, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:

receiving inputs including a serial communication protocol specification and serial port settings associated with a serial communication channel from a remote terminal unit (RTU) builder, wherein the serial communication channel comprises a multidrop serial communication channel between a set of field devices and an RTU configured to connect to the set of field devices, and the RTU builder is configured to be communicably coupled to multiple RTUs through the multidrop serial communication channel and determine a communication protocol for each of the multiple RTUs to connect with a corresponding set of field devices;

determining a transmission speed, a request size, and a response size of the serial communication channel based on the received inputs;

determining a timeout value corresponding to the serial communication channel based on the transmission speed, the request size, and the response size;

automatically setting a timeout parameter for the serial communication channel using the determined timeout value, the timeout parameter defining a length of time between a start time of a transmission of a request through the serial communication channel and an end time of waiting to receive a response;

transmitting the request at the start time of the transmission to a field device in the set of field devices;

in response to not receiving the response to the request before the end time, determining that the RTU is not connected to the field device through the serial communication channel;

retransmitting the request to the field device until a threshold number of requests have been attempted;

upon reaching the threshold number of requests, ending the retransmitting, and notifying a user that all attempts to establish the serial communication channel with the field device have failed; and operating the set of field devices, excluding the field device determined to not be connected, through the serial communication channel.

2. The method of claim 1, further comprising:
in response to receiving the response before the end time, determining that the RTU is connected to the field device through the serial communication channel.

3. The method of claim 1, wherein determining the timeout value comprises: multiplying the transmission speed by a sum of the request size and the response size.

4. The method of claim 1, wherein the serial port settings include: a baud rate, a number of data bits, and a number of stop bits.

5. The method of claim 1, wherein determining the request size and the response size based on the inputs comprises: determining the request size and the response size based on the serial communication protocol specification.

6. The method of claim 1, wherein determining the transmission speed based on the inputs comprises: determining the transmission speed based on the serial port settings.

7. A remote terminal unit (RTU) comprising:
processing circuitry configured to:
receive inputs including a serial communication protocol specification and serial port settings associated with a serial communication channel from an RTU builder, wherein the serial communication channel comprises a multidrop serial communication channel between a set of field devices and the RTU configured to connect to the set of field devices, and the RTU builder is configured to be communicably coupled to multiple RTUs through the multidrop serial communication channel and determine a communication protocol for each of the multiple RTUs to connect with a corresponding set of field devices;
determine a transmission speed, a request size, and a response size of the serial communication channel based on the inputs;
determine a timeout value corresponding to the serial communication channel based on the transmission speed, the request size, and the response size;
automatically set a timeout parameter for the serial communication channel using the determined timeout value, the timeout parameter defining a length of time between a start time of a transmission of a request through the serial communication channel and an end time of waiting to receive a response;
transmit the request at the start time of the transmission to a field device in the set of field devices;
in response to not receiving the response to the request before the end time, determine that the RTU is not connected to the field device through the serial communication channel;
retransmit the request to the field device until a threshold number of requests have been attempted;
upon reaching the threshold number of requests, end the retransmitting, and notify a user that all attempts to establish the serial communication channel with the field device have failed; and
operate the set of field devices, excluding the field device determined to not be connected, through the serial communication channel.

8. The RTU of claim 7, wherein the processing circuitry is further configured to:
in response to receiving the response before the end time, determine that the RTU is connected to the field device through the serial communication channel.

9. The RTU of claim 7, wherein the processing circuitry is configured to determine the timeout value by: multiplying the transmission speed by a sum of the request size and the response size.

10. The RTU of claim 7, wherein the serial port settings include: a baud rate, a number of data bits, and a number of stop bits.

11. The RTU of claim 7, wherein the processing circuitry is configured to determine the request size and the response size based on the inputs by: determining the request size and the response size based on the serial communication protocol specification.

12. The RTU of claim 7, wherein the processing circuitry is configured to determine the transmission speed based on the inputs by: determining the transmission speed based on the serial port settings.

13. A non-transitory computer readable medium embodying a computer program, the computer program comprising computer readable program code that, when executed by processing circuitry, causes the processing circuitry to:
receive inputs including a serial communication protocol specification and serial port settings associated with a serial communication channel from a remote terminal unit (RTU) builder, wherein the serial communication channel comprises a multidrop serial communication channel between a set of field devices and an RTU configured to connect to the set of field devices, and the RTU builder is configured to be communicably coupled to multiple RTUs through the multidrop serial communication channel and determine a communication protocol for each of the multiple RTUs to connect with a corresponding set of field devices;
determine a transmission speed, a request size, and a response size of the serial communication channel based on the inputs;
determine a timeout value corresponding to the serial communication channel based on the transmission speed, the request size, and the response size;
automatically set a timeout parameter for the serial communication channel using the determined timeout value, the timeout parameter defining a length of time between a start time of a transmission of a request through the serial communication channel and an end time of waiting to receive a response;
transmit the request at the start time of the transmission to a field device in the set of field devices;
in response to not receiving the response to the request before the end time, determine that the RTU is not connected to the field device through the serial communication channel;
retransmit the request to the field device until a threshold number of requests have been attempted;
upon reaching the threshold number of requests, end the retransmitting, and notify a user that all attempts to establish the serial communication channel with the field device have failed; and
operate the set of field devices, excluding the field device determined to not be connected, through the serial communication channel.

14. The non-transitory computer readable medium of claim 13, wherein the computer program further comprises computer readable program code that, when executed by the processing circuitry, causes the processing circuitry to:
in response to receiving the response before the end time, determine that the RTU is connected to the field device through the serial communication channel.

15. The non-transitory computer readable medium of claim 13, wherein the computer program further comprises computer readable program code that, when executed by the processing circuitry, causes the processing circuitry to determine the timeout value by: multiplying the transmission speed by a sum of the request size and the response size.

16. The non-transitory computer readable medium of claim 13, wherein the serial port settings include: a baud rate, a number of data bits, and a number of stop bits.

17. The non-transitory computer readable medium of claim 13, wherein the computer program further comprises computer readable program code that, when executed by the processing circuitry, causes the processing circuitry to determine the request size and the response size based on the inputs by: determining the request size and the response size based on the serial communication protocol specification.

18. The non-transitory computer readable medium of claim 13, wherein the computer program further comprises computer readable program code that, when executed by the processing circuitry, causes the processing circuitry to determine the transmission speed based on the inputs by: determining the transmission speed based on the serial port settings.

* * * * *